United States Patent
Graves et al.

(10) Patent No.: US 9,765,969 B2
(45) Date of Patent: Sep. 19, 2017

(54) COUNTER SWIRL DOUBLET COMBUSTOR

(71) Applicant: Rolls-Royce Corporation, Indianapolis, IN (US)

(72) Inventors: Charles B. Graves, Avon, IN (US); Donald M. Wicksall, New Palestine, IN (US); Thomas F. Richardson, Jr., Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 769 days.

(21) Appl. No.: 14/137,391

(22) Filed: Dec. 20, 2013

(65) Prior Publication Data

US 2015/0040576 A1    Feb. 12, 2015

Related U.S. Application Data

(60) Provisional application No. 61/802,168, filed on Mar. 15, 2013.

(51) Int. Cl.
| | |
|---|---|
| *F23R 3/04* | (2006.01) |
| *F23R 3/28* | (2006.01) |
| *F23R 3/06* | (2006.01) |
| *F02C 3/00* | (2006.01) |
| *F23R 3/00* | (2006.01) |

(52) U.S. Cl.
CPC .............. *F23R 3/28* (2013.01); *F02C 3/00* (2013.01); *F23R 3/002* (2013.01); *F23R 3/06* (2013.01); *F05D 2220/32* (2013.01); *F05D 2240/35* (2013.01); *Y02T 50/675* (2013.01)

(58) Field of Classification Search
CPC .... F23R 3/002; F23R 3/06; F23R 3/08; F23R 3/10; F23R 3/12; F23R 3/14; F23R 3/28; F02C 3/00; F05D 2220/32; F05D 2240/35; Y02T 50/675; F23D 14/20–14/24
USPC .................................... 60/754, 759
See application file for complete search history.

(56) References Cited

U.S. PATENT DOCUMENTS

| | | | | |
|---|---|---|---|---|
| 2,543,755 A | * | 3/1951 | Berger ...................... | F23R 3/06 60/752 |
| 3,099,134 A | * | 7/1963 | Calder ...................... | F23R 3/04 60/746 |
| 3,820,324 A | * | 6/1974 | Grindley .................. | F23R 3/04 60/738 |
| 3,956,886 A | * | 5/1976 | Sedgwick ............... | F23R 3/007 60/753 |
| 4,928,481 A | | 5/1990 | Joshi et al. | |
| 5,284,019 A | * | 2/1994 | Vdoviak ................... | F23C 7/02 60/733 |

(Continued)

FOREIGN PATENT DOCUMENTS

DE      102011012414 A1    8/2012

OTHER PUBLICATIONS

International Search Report PCT/US2013/068704 mailed on Jul. 16, 2014.

*Primary Examiner* — William H Rodriguez
*Assistant Examiner* — Jason H Duger
(74) *Attorney, Agent, or Firm* — Fishman Stewart PLLC

(57) ABSTRACT

An improved combustor for a gas turbine is operable to provide high combustion efficiency in a compact combustion chamber. The combustor includes a counter swirl doublet for improved fuel/air mixing. The enhanced combustor assembly and method of operation improves operation of the turbine.

20 Claims, 6 Drawing Sheets

(56) References Cited

U.S. PATENT DOCUMENTS

| | | | |
|---|---|---|---|
| 5,590,530 A * | 1/1997 | Owen | F23R 3/045 60/748 |
| 6,240,731 B1 | 6/2001 | Hoke et al. | |
| 6,412,272 B1 | 7/2002 | Titterton, III et al. | |
| 6,675,587 B2 * | 1/2004 | Graves | F23R 3/04 60/748 |
| 6,810,673 B2 * | 11/2004 | Snyder | F23R 3/002 60/732 |
| 7,093,439 B2 * | 8/2006 | Pacheco-Tougas | F23R 3/002 60/752 |
| 7,926,284 B2 * | 4/2011 | Zupanc | F23R 3/06 60/752 |
| 8,056,342 B2 * | 11/2011 | Shelley | F23R 3/06 60/752 |
| 8,616,004 B2 * | 12/2013 | Zupanc | F23R 3/06 60/754 |
| 8,739,546 B2 * | 6/2014 | Snyder | F23R 3/06 60/752 |
| 9,068,748 B2 * | 6/2015 | Hoke | F23R 3/06 60/752 |
| 2007/0084219 A1 * | 4/2007 | Bernier | F23R 3/002 60/804 |
| 2007/0193248 A1 * | 8/2007 | Bessagnet | F23R 3/06 60/39.01 |
| 2009/0308077 A1 * | 12/2009 | Shelley | F23R 3/06 60/752 |
| 2010/0024427 A1 | 2/2010 | Graves et al. | |
| 2010/0242483 A1 * | 9/2010 | Snyder | F23R 3/06 60/748 |
| 2011/0271678 A1 | 11/2011 | Bourgois et al. | |
| 2014/0271161 A1 * | 9/2014 | Lazur | F01D 5/282 415/200 |
| 2015/0003958 A1 * | 1/2015 | Uskert | F01D 11/24 415/1 |

* cited by examiner

COUNTER SWIRL DOUBLET COMBUSTOR

CROSS-REFERENCE TO RELATED APPLICATIONS

This application claims priority to U.S. Provisional Patent Application No. 61/802,168 filed Mar. 15, 2013, the contents of which are hereby incorporated in their entirety.

FIELD OF THE TECHNOLOGY

The present disclosure relates to a combustor for a gas turbine engine and more particularly, to a combustor having a counter swirl doublet for improved fuel/air mixing.

BACKGROUND

Combustors in gas turbine engines have essentially one operational objective. Namely-combust an air fuel mixture at 100% efficiency in the shortest most compact combustion chamber possible and wherein the combustion gases exit the combustor with an even temperature profile across the exit plane. To date no combustor meets this objective. Engineers continue to work on new combustor designs to approach an ideal level of efficiency. Some existing gas turbine combustors have various shortcomings, drawbacks, and disadvantages relative to certain applications. Accordingly, there remains a need for further contributions in this area of technology.

SUMMARY

One embodiment of the present disclosure is a unique combustor operable to provide high combustion efficiency in a compact combustion chamber. Other embodiments include unique apparatuses, systems, devices, hardware, methods, and combinations for gas turbine engine combustors. Further embodiments, forms, features, aspects, benefits, and advantages of the present application shall become apparent from the following description and drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
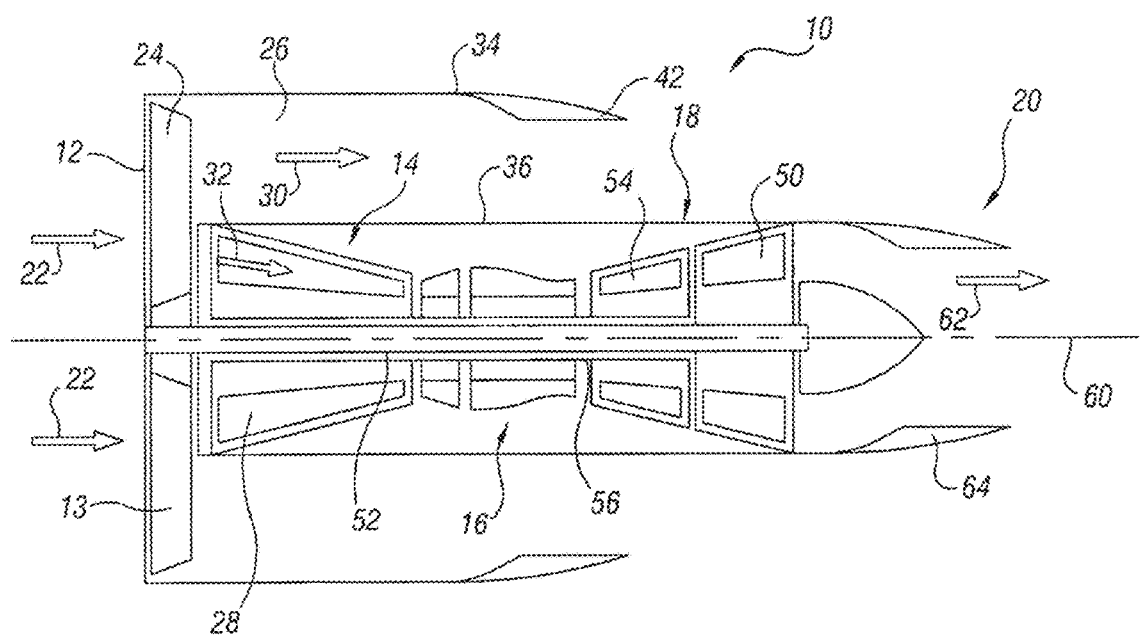
FIG. 1 is a schematic cross-sectional side view of a turbofan engine according to an embodiment of the present disclosure.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

When the terms "upper and lower", "outer and inner" or similar words describing orientation or relative positioning are used in this disclosure, it should be read to apply to the relative location in a particular view and not as an absolute orientation of a particular portion of an inventive concept as defined herein.

Combustion temperature uniformity across the outlet of a combustion chamber is important to the efficiency and operational life of the combustor and to other components in a gas turbine engine such as first stage turbine vanes and the like. If thorough mixing is not achieved, a non-uniform temperature variation of combustion products exiting the combustor will result. This, in turn, could potentially subject downstream turbine components to localized overheating. Such overheating can affect the durability of downstream turbine parts and could potentially decrease overall turbine efficiency and longevity. As will be readily appreciated, the more thorough the mixing and combusting of fuel and air, the lower the likelihood of localized overheating due to hot spots or hot streaks in the combustion byproducts. Hot streaks or hot spots are defined an area of increased temperature relative to the bulk gas temperature of the hot combustion gas byproducts as is known to those skilled in the art. A precision counter-swirl doublet combustor defined in the present disclosure provides a shortened combustor length and a level of temperature uniformity that was previously unknown in the art.

According to an embodiment of the present disclosure, an annular precision counter-swirl doublet combustor includes a combustor having a forward end, an opposite aft end, and an interior. The combustor can include at least one fuel nozzle operably connected to the forward end of the combustor. The fuel nozzles can optionally include an air swirler to mix air at the point of fuel injection. The fuel nozzles include a fuel swirler to impart a swirl into the injected fuel about a centerline axis of the nozzle. The combustor includes one row of primary air inlets formed as doublet pairs for a corresponding fuel nozzle in both the inner and the outer liners of the combustor. Prior art configurations having two or more rows of primary inlet holes in a circumferential plane spaced apart along a longitudinal axis of the combustor have been removed and the combustor according to the present disclosure can have a reduced length by at least as much as the length of the second or more rows of primary inlet holes. The primary inlet holes may include a chute for directing a passage of air through the inlet into the interior (combustion chamber) of the combustor. The combustor can be secured to a fixed structure proximate the forward end of the combustor.

Annular combustors typically employ an array of fuel nozzles located on or near a centerline of a forward bulkhead of a combustor. In general, the fuel nozzles spray fuel into the combustor and to mix with air for combustion. The ideal air to fuel ratio is called the stoichiometric ratio which means the exact amount fuel and air is supplied to completely combust the air and fuel without excess remaining reactants. While air swirlers at the fuel injector can be somewhat effective, the swirling motion can centrifuge hotter, less dense gasses toward a centerline of a fuel nozzle, creating a temperature "bulls-eye" at the exit of the combustor. To mitigate this effect, air swirlers have been typically followed by at least two rows of primary air inlets per fuel injector or nozzle. It has been discovered by the inventors that eliminating the second and any subsequent rows downstream of the first row of primary air inlets and doubling up the inlet holes in the inner and out liners can significantly increase the uniformity of fuel/air mixing and therefore, provide a more uniform temperature distribution at the combustor exit. In some gas turbine applications it is contemplated that a benefit may occur with three or more primary air inlets positioned in one row of a circumferential plane in both the inner and outer liners depending on the design configuration, pressures and flow rates required. An additional benefit to this concept is that the combustor can be significantly shortened while still providing adequate length for complete combustion. The combustor of the present disclosure not only provides enhanced mixing of the combustion gases (fuel and air mixture) within the combustion chamber, but also achieves a reduction of peak temperatures or hot streaks at the exit plane of the combustion chamber. Thus, the combustor described herein provides a more uniform temperature distribution that reduces the formation of hot streaks while advantageously cooling the inner and outer liners of the combustion chamber.

In accordance with the present disclosure, the combustor may include an annular combustion chamber formed between an inner liner and an outer liner coaxially disposed relative to each other to form a combustion zone. A plurality of fuel injectors or nozzles is configured to swirl the fuel and air mixture injected therefrom into the combustion zone. The inner liner includes at least two primary air inlets circumferentially arranged in a plane or row downstream of and to a lateral side of each of the fuel nozzles. Similarly, the outer liner includes at least two primary air inlets circumferentially arranged in a plane or row downstream of and to an opposite lateral side of each of the fuel nozzles. The outer pair of primary inlet holes or "outer doublets" and the inner pair of primary inlet holes or "inner doublets" are offset to opposing lateral sides of the fuel nozzle such that the air jets formed create an opposite swirl direction to that of the fuel swirl direction. It should be understood that the swirl pattern of the fuel can be clockwise or counter clockwise as long as the air flow jets of the doublets are injected in the opposite direction to create a counter swirl for ideal mixing of the air and fuel In this way, the air jets injected into the combustion chamber from the primary air inlets oppose the direction of swirl of the fuel that is injected from each of the fuel injectors. Thus, the fuel and air mixture is thoroughly mixed with the results being an enhanced uniform exit temperature distribution by eliminating hot streaks entering the turbine. In one embodiment each of the primary air jets traverse the combustion zone to impinge a respective opposing liner. The primary air inlets can have any cross sectional shape desired, but circular, oval or elliptical have been found to be adequate geometries for the primary inlet holes. In some embodiments elliptical shaped holes offer enhanced air penetration into the combustion zone and enhanced mixing of the air jets with the fuel and air mixture to provide an improved exit temperature profile. Further, in some embodiments, chutes may be added to the primary inlet holes guide the air jets as desired.

It has been found by the inventors herein that two smaller air jets in a counter swirl doublet configuration mix quicker and more thoroughly than a single jet of equivalent effective flow area delivering the same mass flow rate of air to the combustion chamber. Every fuel type has a known stoichiometric air/fuel ratio or in other words how many pounds of air it takes to burn a pound of fuel. The stoichiometric ratio for different types of fuel varies, but for a typical hydrocarbon fuel, the air/fuel ratio can be in the range of approximately 14.7 to 1. The amount of fuel needed for a maximum power cycle point of a gas turbine engine determines how much air needs to be supplied for stoichiometric combustion. Combustors are typically supplied excess air to ensure complete combustion and to cool selected areas of the combustor or to lower the average temperature of the exhaust gases, so the primary air inlets can be sized to meet multiple design requirements.

Once the required air flow rate is determined, the primary doublet air inlet holes can be designed using the relationship between perimeter and cross-sectional area for each hole at a given air pressure. The cross-sectional area for a round jet can be calculated from $A=\pi*d^2/4$, the perimeter can be determined by $P=\pi*d$, where d is the diameter for a round hole. The perimeter defines the boundary at which mixing takes place, while the cross-sectional area defines the mass flow rate and the velocity at a given pressure. The ratio of P/A would govern the speed of the mixing for a given amount of airflow and for a round hole the equation is $P/A=4/D$. As D decreases P/A increases, thus a smaller group of holes will inherently mix out faster. This analysis may lead one to believe that it would be advantageous to have many very small holes providing combustion air to the injected fuel. However, the counter-swirl concept has been found to work only if the air jets are able to penetrate to the other side if the combustion chamber, i.e. to the inner or outer liner respectively. The penetration distance is governed by the momentum of the air jet, the momentum of the cross-flow velocities, the ratio of critical dimensions, the diameter of the air jet, and the height between the inner and outer liners. When an air jet passes below a threshold diameter it provides insufficient momentum to fully penetrate the counter swirl and it becomes ineffective at mixing the air and fuel. It has been found for typical annular combustor applications that two primary air jets entering through the outer liner and two primary air jets entering through the inner liner per fuel nozzle as a doublet configuration to provide a counter swirl is most effective for many applications. However, in some applications it is possible that three or more primary air jets per from the inner and outer liners per fuel nozzle could be more effective in providing mixing and increased combustion efficiency.

In the case of an ellipse shaped primary air inlet hole, the cross-sectional area is $A=\pi*(a*b)/4$ where "a and b" are the major and minor axes of the hole. The perimeter can be approximated by the equation $P \sim 2*\pi \mathrm{sqrt}((a^2+b^2)/2)$. In one exemplary embodiment an elliptical primary hole design would have a ratio of major to minor axis of 2. Substituting $a=2b$ into the equations leads to a governing equation of $P/A=2*\mathrm{sqrt}(10)/b$. It can be calculated the smaller that b is the faster the air and fuel mixes with the same momentum limitation as above. Once again two elliptical holes per inner liner and two elliptical holes per outer liner have been found to be ideal for maximum combustion mixing efficiency.

Since an ellipse as previously described would be replaced by a circle whose diameter would be D=sqrt(2)b putting that into the above equation would show that the ratio of P/A for an ellipse is equivalent to sqrt(20)/D or 4.47/D. Thus the ellipse of an equivalent effective flow area mixes out faster than the round hole. It has be found that similar to the round hole configuration, that two elliptical holes per inner liner and two elliptical holes per outer liner typically lead to a maximum combustion mixing efficiency. However in some configurations three or more elliptical holes per inner and outer liner for each fuel nozzle are contemplated and may be more effective in some applications. An exemplary embodiment of the present disclosure will now be described.

Referring now to FIG. 1, a schematic view of a gas turbine engine configured as a turbofan engine 10 is depicted. While the turbofan engine 10 is illustrated in simplistic schematic form, it should be understood that the present disclosure including a novel combustor is not limited to any particular engine design or configuration and as such may be used with any form of gas turbine engine such as turboprops, turbojets, unducted fan engines, and others having a range of complexities including multiple spools (multiple turbines operationally connected to multiple compressors), variable geometry turbomachinery, and in commercial or military applications. The systems can include other forms of gas turbine engines such as those for generating electric power, fluid pumping applications, land vehicle and watercraft propulsion.

The turbofan engine 10 will be described generally as one embodiment of the present disclosure, however significant details regarding gas turbine engine design and operation will not be presented herein as it is believed that the theory of operation and general parameters of gas turbine engines are well known to those of ordinary skill in the art. The turbofan engine 10 includes an inlet section 12, a fan section 13, a compressor section 14, a combustor section 16, a turbine section 18, and an exhaust section 20. In operation, air illustrated by arrows 22 is drawn in through the inlet 12 and passes through at least one fan stage 24 of the fan section 13 where the ambient air is compressed to a higher pressure. After passing through the fan section 13, the air can be split into a plurality of flow streams. In this exemplary embodiment, the airflow is spilt into a bypass duct 26 and a core passageway 28. Airflow through the bypass duct 26 and the core passageway 28 is illustrated by arrows 30 and 32 respectively. The bypass duct 26 encompasses the core passageway 28 and can be defined by an outer circumferential wall 34 and an inner circumferential wall 36. The bypass duct 26 can also include a bypass nozzle 42 operable for creating a pressure differential across the fan 24 and for accelerating the bypass airflow 30 to provide bypass thrust for the turbofan engine 10.

The core airflow 32 enters the core passageway 28 after passing through the fan section 13. The core airflow is then further compressed in the compressor section 14 to a higher pressure relative to both ambient pressure and the air pressure in the bypass duct 26. The air is mixed with fuel in the combustor section 16 wherein the fuel/air mixture burns and produces a high temperature working fluid from which the turbine section 18 extracts power. The turbine section 18 can include low pressure turbine 50 mechanically coupled to the fan section 13 through a low pressure shaft 52 and a high pressure turbine 54 mechanically coupled to the compressor section 14 through a high pressure shaft 56. The shafts 52, 56 rotate about a centerline axis 60 that extends axially along the longitudinal axis of the engine 10, such that as the turbine section 18 rotates due to the forces generated by the high pressure working fluid, the fan section 13 and compressor section 14 section are rotatingly driven by the turbine section 18 to produce compressed air. After passing through the turbine section 18, the core exhaust flow represented by arrow 62 is accelerated to a high velocity through a core exhaust nozzle 64 to produce thrust for the turbofan engine 10.

Figure 2:
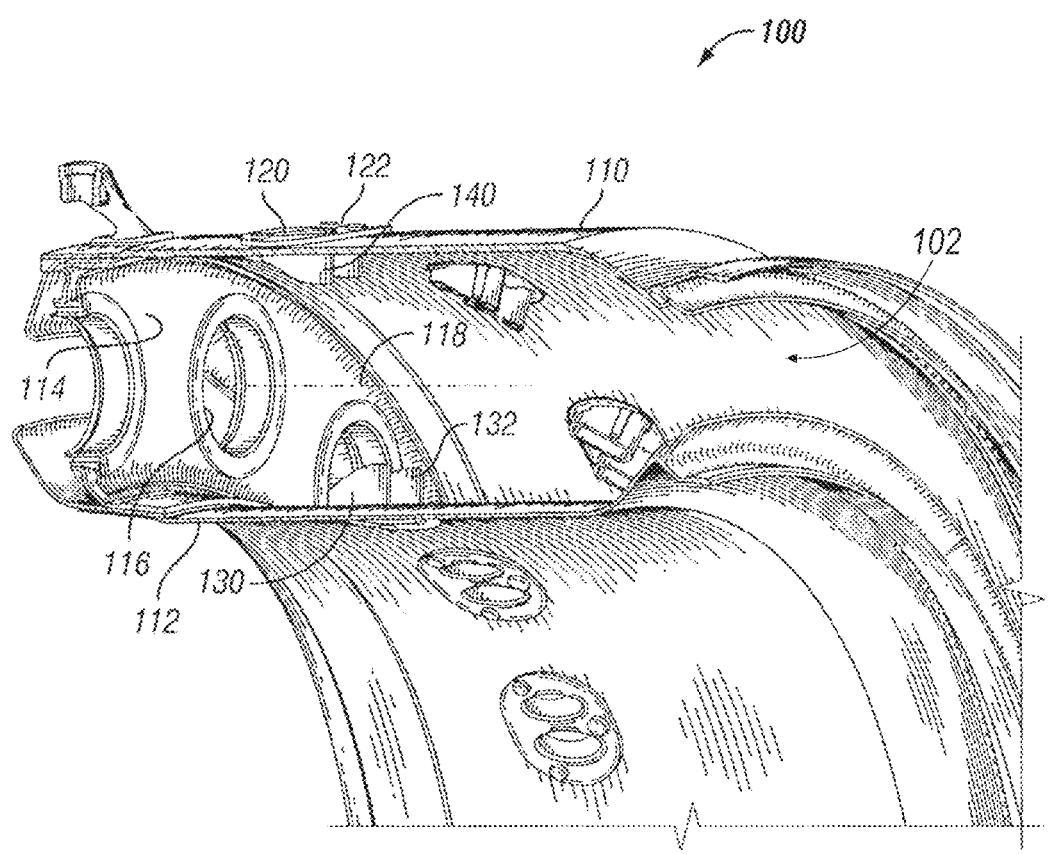
FIG. 2 is partial perspective view of a combustor according to an embodiment of the present disclosure.

Referring now to FIG. 2, a partial perspective view of an annular combustor 100 is shown therein. The annular combustor 100 can have an outer liner 110 and an inner liner 112 forming concentric walls about a combustion chamber 102 formed therebetween. A combustor bulkhead 114 extends circumferentially between the inner and outer liners 112, 110, respectively. A plurality of fuel nozzle ports 116 can be formed in the bulkhead 114 of the combustor 100. Each fuel nozzle port 116 is adapted to receive a fuel nozzle (not shown in FIG. 1) for delivering fuel into the combustion chamber 100. First and second outer primary air inlet holes 120, 122 can be formed as an outer doublet through the outer liner 110 of the combustion chamber 102. First and second inner primary inlet air holes 130, 132 can be formed as an inner doublet through the inner liner 112 of the combustion chamber 102. The doublets are offset from a corresponding fuel nozzle so as to impart a counter swirl to the fuel swirl imparted by the fuel nozzle 160 (see FIG. 3). Combustion airflow can enter through the primary inlet holes and mix with the fuel from the nozzle in the combustion chamber 102. The outer primary inlet holes 120, 122 and the inner primary inlet holes 130, 132 can include a chute 140 extending partially into the combustion chamber 100 from each respective hole. The chutes 140 can help direct combustion air in a desired direction for a desired mixing velocity. Each doublet may be formed by a pair of circumferentially spaced chutes 140 that are integrally connected at a respective flange attached to the respective liner as shown in FIG. 2.

Figure 3:
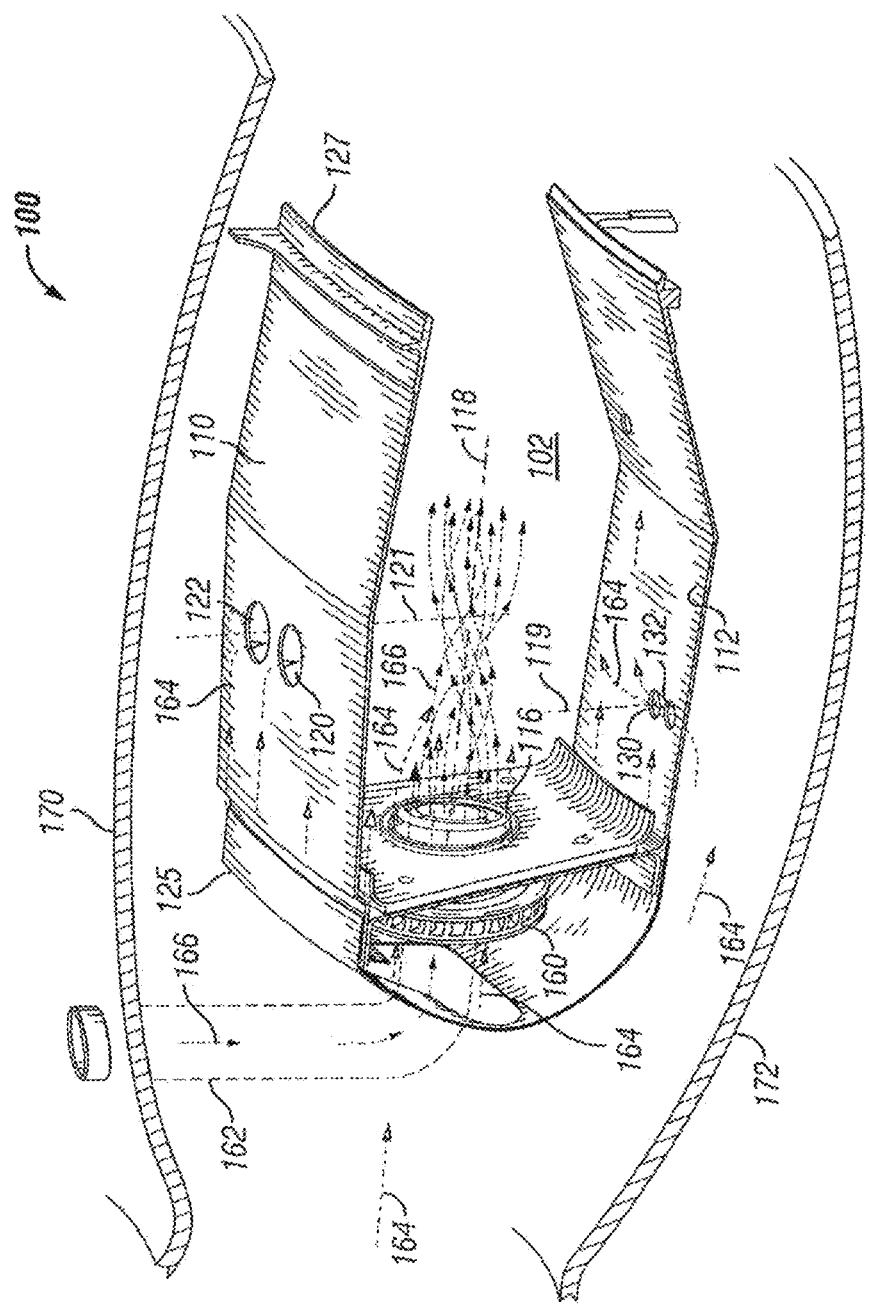
FIG. 3 is a partial perspective view of the combustor of FIG. 2 including a partial fuel system according to an embodiment of the present disclosure.

Referring now to FIG. 3, a partial perspective sector view of the annular combustor 100 is illustrated. The inner and outer liners 112, 110 extend from a first end 127 of the combustor 100 to a second end 125 of the combustor 100. The first and second outer primary holes 120, 122 can extend through the outer liner 110 and first and second inner primary holes 130, 132 can extend through the inner liner 112 to provide fluid communication between a source of air and the combustion chamber 102. Each of the primary inlet holes 120, 122, 130 and 132 can be formed of any shape desired such as circular, oval, elliptical or the like.

The fuel nozzle 160 can be coupled to the fuel nozzle port 114 and receive fuel represented by arrows 166 from a fuel inlet line 162. Airflow represented by arrows 164 can be accelerated through a portion of the fuel nozzle 160 into the combustion chamber 102. Primary combustion air can be delivered to the combustion chamber 102 through the primary holes 120, 122, 130, and 132 of the outer liner 110 and the inner liner 112, respectively. The combustor 100 can include an outer combustion case 170 and an inner combustion case 172 to connect with other structural cases adjacent thereto such as the combustor such as a combustor case a turbine case a (not shown). The combustor 100 can be held in fixed position with the inner and outer combustion cases 170, 172, respectively.

As described previously, prior art combustors typically have two or more rows of circumferentially positioned primary inlet holes formed in the inner and outer liners 110, 112 downstream of the fuel nozzle 160. The inventors have found that by eliminating the second one or more rows of primary inlet holes downstream of the first row and adding a second hole to form a doublet pair of holes 120, 122 in the outer liner 110 and a doublet pair of holes 130, 132 in the inner liner 112, that a more effective mixing of the fuel and air can be effectuated which provides for a more efficient and more compact combustor design without damaging hot spots or hot streaks exiting the combustor.

Although the exemplary embodiment does not show dilution holes or effusion holes, it is noted and within the scope of this disclosure that one or more dilution and or effusion holes may be formed in the inner and outer liners downstream of the primary inlet holes used to provide combustion air. The dilution and/or effusion holes can deliver additional air to cool the average bulk temperature of the combustion products and/or cool components that are heated by the hot combustion gases.

Figure 4:
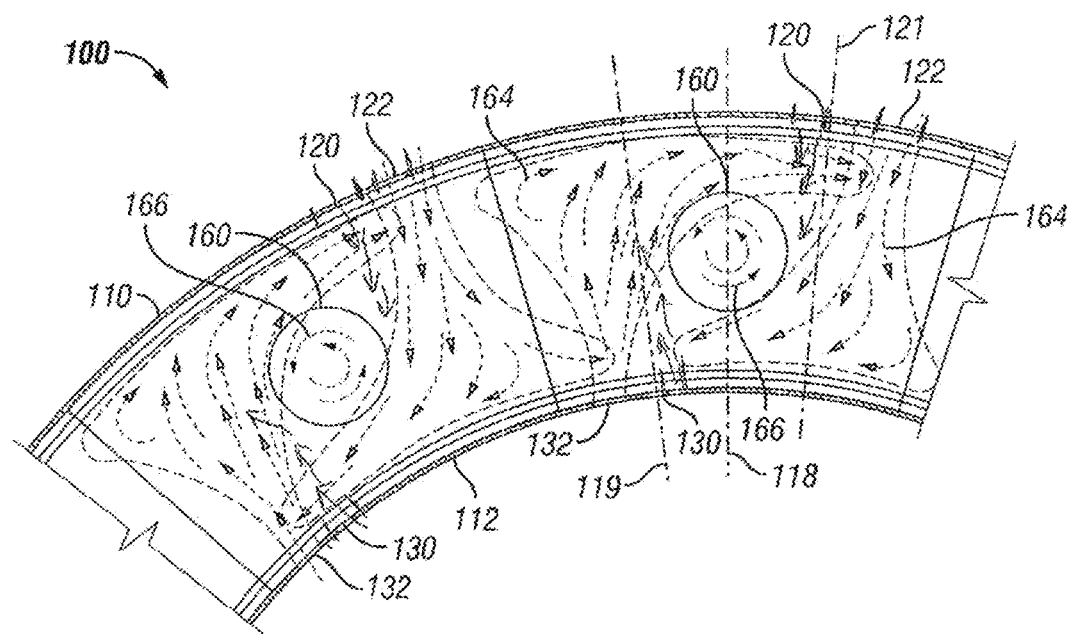
FIG. 4 is a schematic cross-sectional view of a portion of the combustor including representative fuel/air mixing flow patterns according to an embodiment of the present disclosure.

Referring now to FIG. 4, a partial cross-sectional view of a portion of the combustor 100 is schematically illustrated with streams of air represented by arrows 164 and streams of fuel represented by arrows 166. The fuel nozzles 160 are represented by circles in the illustration. As can be seen in the drawing, a pair of outer holes 120, 122 are offset depicted as line 121 from a centerline 118 of the fuel nozzle 166 in one direction and a pair of inner primary holes 130, 132 are offset depicted by line 119 from the fuel nozzle 160 on the opposing side thereof liner 130 such that the mat maximum amount of mixing airflow occurs closely downstream of the fuel nozzle 160.

Although the fuel swirl is shown in a counter clockwise direction in this view, it should be understood that the swirl could be formed in a clockwise direction and the inlet holes in the inner and outer liners would necessarily be moved to the opposite side of line 118.

Figure 5:
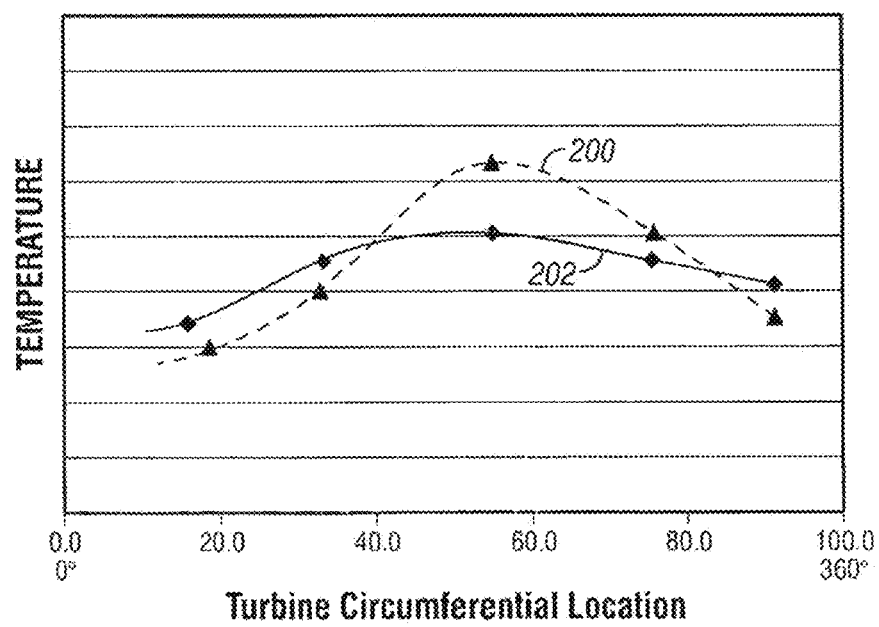
FIG. 5 is a plot representing a temperature profile improvement due to improved fuel/air mixing in the combustor according to an embodiment of the present disclosure.

Referring to FIG. 5, a representative plot of temperature versus turbine circumferential location is illustrated showing a predictive plot of relative improvement of a temperature profile along a circumferential plane using the counter swirl doublet configuration of the present disclosure. Prior art temperature variation in an exemplary circumferential plane is shown in line 200. An exemplary plot of temperature variation of the present disclosure around a circumferential plane is shown in line 202. A perfectly mixed and combusted fuel would have an essentially flat line. Although not perfectly flat, the temperature variation of a combustor defined by the present disclosure show a flatter curve which means a better temperature profile with less "hot streaks" to degrade hot section components relative to prior art combustors.

Figure 6:
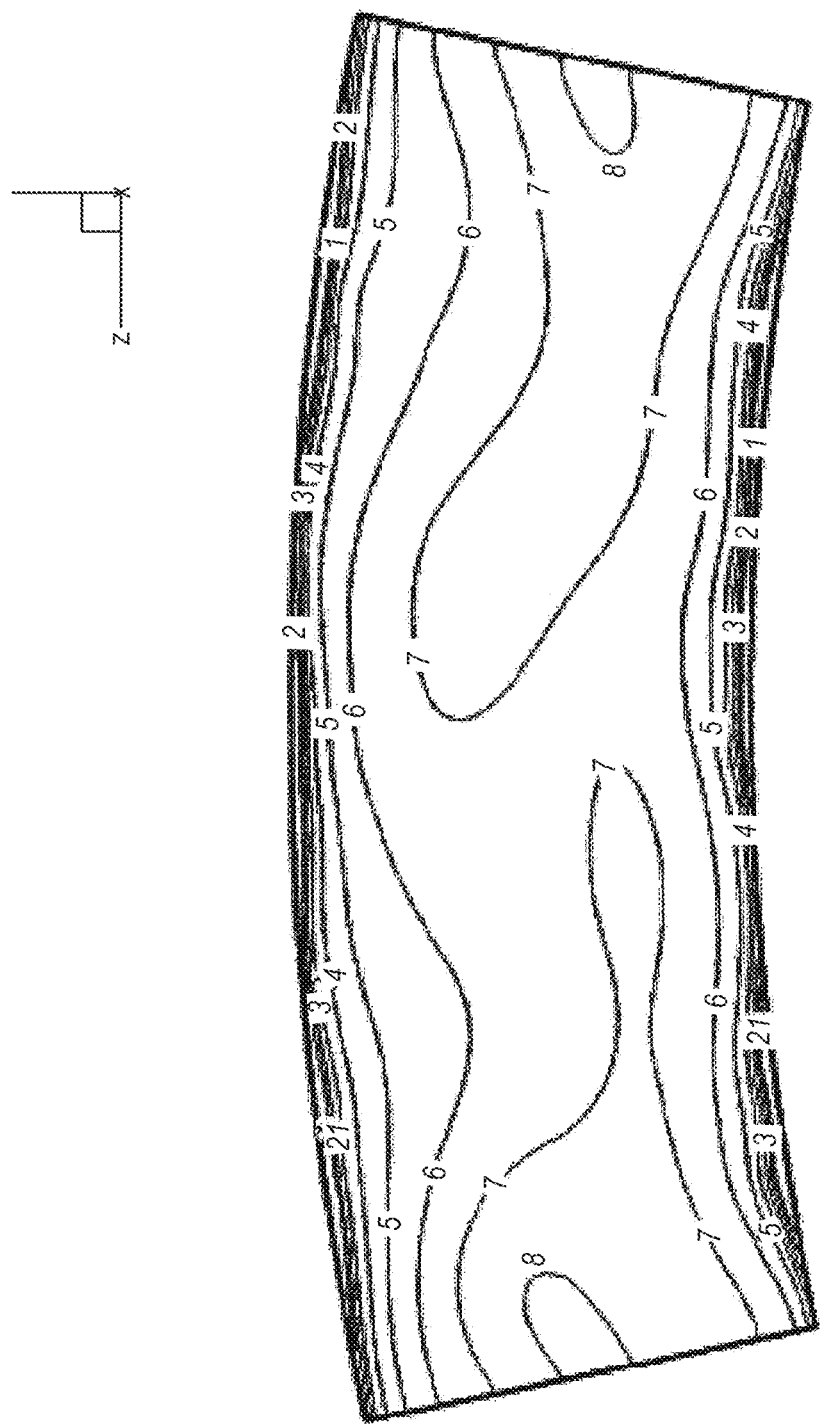
FIG. 6 is a temperature profile contour plot of a prior art combustor.

Referring now to FIG. 6, a contour temperature plot of a representative sector of an annular combustor according to a prior art combustor is shown. A perfectly mixed combustor at 100% efficiency would have a single temperature contour across the entire sector. As can be seen in FIG. 6 there are eight contours representing temperature gradients across the sector. Local "hot spots" such as the temperature at contour 8 can cause life degradation to downstream components in the engine that are contacted by the excessive hot combustor byproducts.

Figure 7:
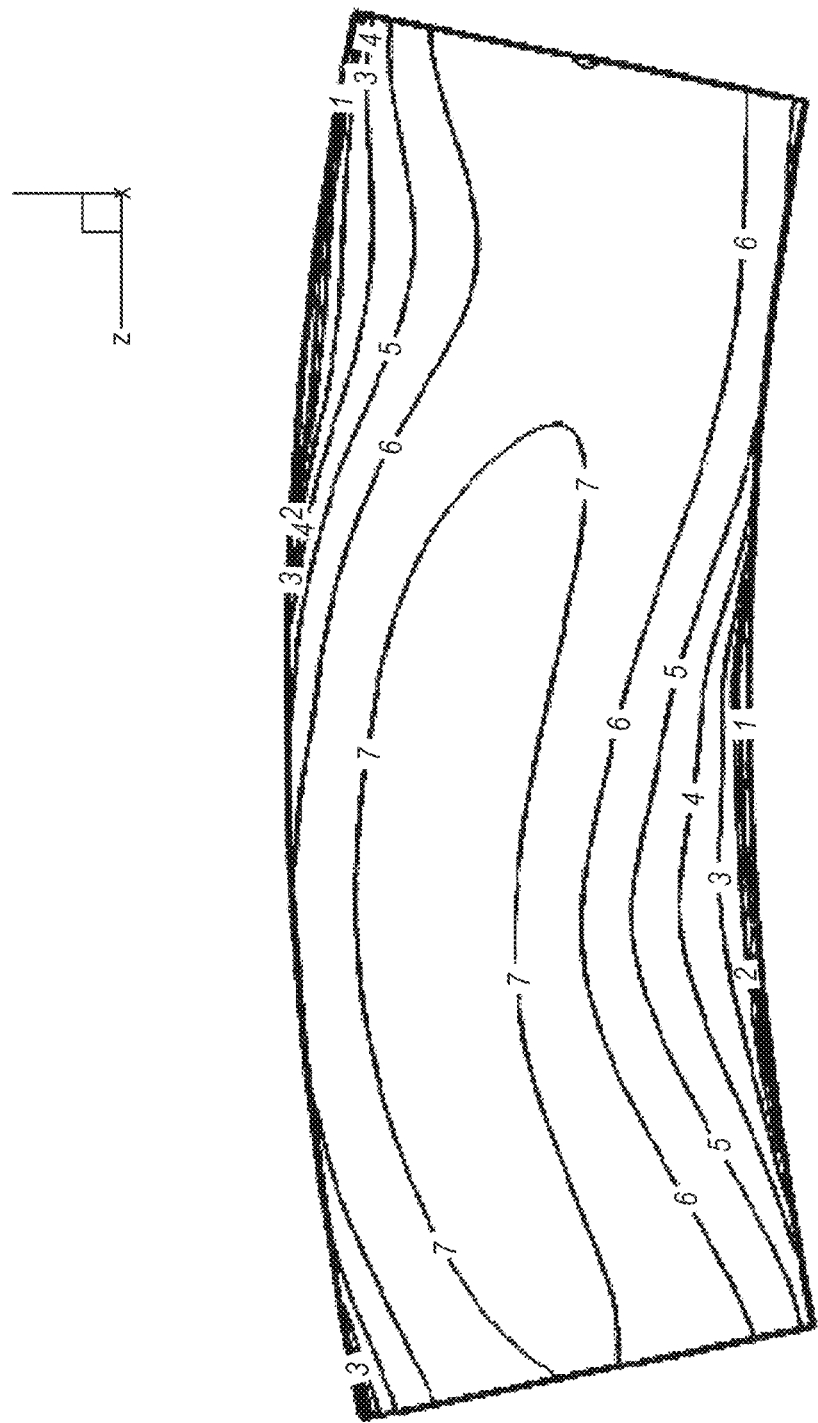
FIG. 7 is a temperature profile contour plot of a combustor according to the present disclosure.

Referring now to FIG. 7, a contour temperature plot of a representative sector of an annular combustor having counterswirl doublet configuration according to the present disclosure is shown. As can be seen in the plot the contours are smoother or more continuous across the sector relative to the prior art combustor of FIG. 6. Furthermore, local hot spots are not as acute with the improved mixing and combustion of the counter swirl doublet combustor of the present disclosure relative to the prior art combustor. It can be observed in the comparative temperature contour plots that the combustor of the present disclosure can have an improved temperature profile which indicates a more complete mixing of the fuel air and complete combustion of the fuel such that a fewer and less severe hot streaks of combustion byproducts exit the combustor of the present disclosure.

By forming a doublet in the inner and outer liners, the effect is to have smaller jets and increased angular momentum which provides for better mixing. The result of the novel doublet counter swirl mixing configuration is a shorter combustor and a more efficient combustion process. The counter swirl doublet pattern has proven to be the most uniform temperature profile across the exit of the combustor. A combustor that is designed to be approximately 2 times the height and length of the bulkhead.

The doublet counter swirl hole pattern can be used with effusion cooled liners tiled liners and lamilloy liners or the like. The holes may be round, elliptical or oval, or a combination thereof. The primary inlet holes may or may not have shoots for improving the aerodynamic design of the mixing pattern.

The combustor and any component related thereto may be made of a metal, a ceramic, and/or an intermetallic material.

While the disclosure has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and embodiment lacking the same may be contemplated as within the scope of the disclosure, that scope being defined by the claims that follow. In reading the claims it is intended that the words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A combustor comprising:
    an inner liner and an outer liner extending circumferentially around an axis of rotation of an engine spaced apart from one another to form a combustion chamber therebetween;
    a bulkhead extending between the inner and outer liners proximate a first end of the combustor;
    a plurality of fuel nozzle ports for receiving fuel nozzles therein, each of the plurality of fuel nozzle ports having a centerline axis extending axially therethrough;
    a first outer primary inlet hole and a second outer primary inlet hole formed as a first doublet pair of circumferentially spaced chutes that are integrally connected at a first flange attached to the outer liner, the first doublet pair extending radially inward from a first circumferential plane through the outer liner to a first side of each respective centerline axis; and
    a first inner primary inlet hole and a second inner primary inlet hole formed as a second doublet pair of circumferentially spaced chutes that are integrally connected at a second flange attached to the inner liner, the second doublet pair extending radially outward from a second circumferential plane through the inner liner to a second side of each respective centerline axis.

2. The combustor of claim 1, further comprising:
a plurality of fuel nozzles engageable with a respective one of the plurality of fuel nozzle ports.

3. The combustor of claim 1, wherein fuel is injected into the combustor with a swirling motion about the centerline axis of at least one fuel nozzle port.

4. The combustor of claim 1, wherein primary combustion air is injected through at least one of the first and second doublet pairs such that an airflow creates a counter swirl relative to swirl of a fuel.

5. The combustor of claim 1, wherein the inner and outer liners include a plurality of effusion holes formed downstream of at least one of the first and second doublet pairs.

6. The combustor of claim 5, wherein the plurality of effusion holes receive a cooling fluid from a cooling fluid source and fluidly connect the cooling fluid source to the combustion chamber.

7. The combustor of claim 1, wherein at least one of the inner liner with the second doublet pair or the outer liner with the first doublet pair includes a plurality of thermal resistant tiles.

8. The combustor of claim 1, wherein the combustor includes a portion made from at least one of a metal, ceramic or intermetal based material.

9. The combustor of claim 1, wherein at least one of the inner liner with the second doublet pair or the outer liner with the first doublet pair includes dual walls spaced apart from one another.

10. The combustor of claim 9, wherein the dual walls include a fluid passageway for passage of a cooling fluid flow therethrough.

11. The combustor of claim 1, wherein at least one of the chutes of the first and second doublet pairs extend into the combustion chamber.

12. The combustor of claim 1, wherein an axial length of the combustion chamber is two times a radial height of the bulkhead.

13. The combustor of claim 1, wherein at least one of the first outer primary inlet hole, second outer primary inlet hole, first inner primary inlet hole, or second inner primary inlet hole includes an oval or elliptical shape.

14. The combustor of claim 1, further including one or more additional holes in at least one of the inner liner or the outer liner.

15. A gas turbine engine comprising:
a compressor section for compressing ambient air;
a combustor section for receiving compressed air and mixing a fuel for combustion;
a turbine section positioned downstream of the combustor section for receiving hot exhaust gases formed in a combustion chamber; and
wherein the combustor section includes a combustor having:
an inner liner and an outer liner extending circumferentially around an axis of rotation of the gas turbine engine and spaced apart from one another to form the combustion chamber therebetween;
a bulkhead extending between the inner and outer liners proximate a first end of the combustor;
a plurality of fuel nozzle ports positioned in the bulkhead and receiving corresponding fuel nozzles therein, each of the plurality of fuel nozzle ports having a centerline axis extending axially therethrough;
a first outer primary inlet hole and a second outer primary inlet hole formed as a first doublet pair of circumferentially spaced chutes that are integrally connected at a first flange attached to the outer liner, the first doublet pair extending radially inward from a first circumferential plane through the outer liner positioned to a first side of at least one of the corresponding fuel nozzles; and
a first inner primary inlet hole and a second inner primary inlet hole formed as a second doublet pair of circumferentially spaced chutes that are integrally connected at a second flange attached to the inner liner, the second doublet pair extending radially outward from a second circumferential plane through the inner liner positioned on an opposing side of the at least one of the corresponding fuel nozzles.

16. The gas turbine engine of claim 15, wherein the combustor produces a temperature profile in an exit plane to minimize overheating.

17. The gas turbine engine of claim 15, wherein combustion air flows through at least one of the chutes of the first and second doublet pairs.

18. The gas turbine engine of claim 15, wherein a fuel has a swirl around the centerline axis of at least one of the plurality of fuel nozzle ports.

19. The gas turbine engine of claim 15, wherein an axial length of the combustor is two times a radial height of the bulkhead.

20. A method comprising:
injecting a fuel spray into a combustion chamber with a swirl in a first circumferential direction;
injecting primary combustion air through a first outer primary inlet hole and a second outer primary inlet hole formed as a first doublet pair of circumferentially spaced chutes that are integrally connected at a first flange attached to an outer liner, the first doublet pair extending radially inward from a first circumferential plane through the outer liner adjacent a first side of the fuel spray; and
injecting the primary combustion air through a first inner primary inlet hole and a second inner primary inlet hole formed as a second doublet pair of circumferentially spaced chutes that are integrally connected at a second flange attached to an inner liner, the second doublet pair extending radially outward from a second circumferential plane through the inner liner adjacent a second side of the fuel spray;
wherein the primary combustion air is injected in an opposite direction to the first circumferential direction of the fuel spray.

* * * * *